United States Patent
Serbutovsky (10) Patent No.: US 10,183,347 B2
(45) Date of Patent: Jan. 22, 2019

(54) ROTARY CUTTING TOOL HAVING AXIAL POSITION ADJUSTMENT ARRANGEMENT

(71) Applicant: Iscar, Ltd., Tefen (IL)

(72) Inventor: Svitoslav Serbutovsky, Kiryat Ata (IL)

(73) Assignee: Iscar, Ltd., Tefen (IL)

(*) Notice: Subject to any disclaimer, the term of this patent is extended or adjusted under 35 U.S.C. 154(b) by 136 days.

(21) Appl. No.: 14/847,258

(22) Filed: Sep. 8, 2015

(65) Prior Publication Data

US 2017/0066066 A1    Mar. 9, 2017

(51) Int. Cl.
  *B23C 5/08* (2006.01)
  *B23C 5/24* (2006.01)
  *B23C 5/10* (2006.01)

(52) U.S. Cl.
  CPC .......... *B23C 5/2458* (2013.01); *B23C 5/1072* (2013.01); *B23C 5/2403* (2013.01); *B23C 5/2486* (2013.01); *B23C 5/2489* (2013.01); *B23C 5/2493* (2013.01); *B23C 5/08* (2013.01); *B23C 5/2417* (2013.01); *B23C 2200/367* (2013.01); *B23C 2210/02* (2013.01); *B23C 2210/205* (2013.01); *B23C 2210/244* (2013.01)

(58) Field of Classification Search
  CPC ....... B23C 5/08; B23C 5/2417; B23C 5/2434; B23C 5/2462; B23C 5/2472; B23C 5/2493; B23C 2210/161; B23C 2210/244; B23C 2210/245
  See application file for complete search history.

(56) References Cited

U.S. PATENT DOCUMENTS

| | | | | |
|---|---|---|---|---|
| 2,322,579 A | * | 6/1943 | Kutscha | B23C 5/242 407/36 |
| 3,077,025 A | * | 2/1963 | Axer | B23C 1/02 33/628 |
| 3,091,138 A | * | 5/1963 | Berry, Jr. | B23C 5/2291 407/46 |

(Continued)

FOREIGN PATENT DOCUMENTS

| | | | | |
|---|---|---|---|---|
| CN | 202291575 U | | 7/2012 | |
| CZ | 8905715 A3 | * | 5/1994 | ............... B23C 5/20 |

(Continued)

OTHER PUBLICATIONS

International Search Report dated Nov. 15, 2016, issued in PCT counterpart application (No. PCT/IL2016/050866).

(Continued)

*Primary Examiner* — Ryan C Rufo
(74) *Attorney, Agent, or Firm* — Womble Bond Dickinson (US) LLP (57) ABSTRACT

A rotary cutting tool includes a tool holder and a tool body releasably attached thereto. The tool body has a cutting portion that includes a peripheral insert pocket, for retaining a cutting insert. The tool holder includes an adjustment arrangement that includes a biasing member, movably attached to the tool holder, having a biasing portion. The cutting portion is adjustable between a non-flexed position and a flexed position. In the flexed position, the cutting portion is elastically deformed in a forward direction due to biasing engagement with the biasing portion, thereby adjusting the axial position of the insert pocket and thus the cutting insert.

38 Claims, 8 Drawing Sheets

(56) References Cited

U.S. PATENT DOCUMENTS

| | | | | |
|---|---|---|---|---|
| 3,323,194 | A * | 6/1967 | Greenleaf | B23C 5/2291 407/41 |
| 3,855,680 | A * | 12/1974 | Wirefelt | B23C 5/20 407/34 |
| 4,547,100 | A * | 10/1985 | Naccarato | B23C 5/2427 407/39 |
| 5,848,858 | A * | 12/1998 | Jager | B23C 5/006 407/34 |
| 6,030,153 | A | 2/2000 | Votsch et al. | |
| 6,056,484 | A | 5/2000 | Mitchell et al. | |
| 6,604,894 | B1 | 8/2003 | Noggle | |
| 6,971,823 | B2 | 12/2005 | Satran et al. | |
| 8,061,937 | B2 * | 11/2011 | Koskinen | B23B 27/1662 407/113 |
| 8,092,124 | B2 | 1/2012 | Spichtinger et al. | |
| 9,676,043 | B2 * | 6/2017 | Lehto | B23C 5/28 |
| 2001/0002972 | A1 * | 6/2001 | Satran | B23C 5/006 407/34 |
| 2003/0002930 | A1 * | 1/2003 | Eisen | B23C 5/202 407/70 |
| 2006/0120813 | A1 * | 6/2006 | Satran | B23C 5/006 407/48 |
| 2009/0249607 | A1 | 10/2009 | Kadosh | |
| 2011/0097165 | A1 * | 4/2011 | Choi | B23C 5/08 407/46 |
| 2013/0022414 | A1 | 1/2013 | Athad | |
| 2013/0129433 | A1 * | 5/2013 | Matsumoto | B23C 5/08 407/51 |
| 2014/0013916 | A1 * | 1/2014 | Athad | B23D 61/04 83/676 |
| 2014/0178136 | A1 | 6/2014 | Mokthar | |
| 2015/0174675 | A1 * | 6/2015 | Eisen | B23D 61/025 83/676 |
| 2015/0202698 | A1 | 7/2015 | Morrison et al. | |
| 2015/0321269 | A1 * | 11/2015 | Malka | B23C 5/08 407/44 |

FOREIGN PATENT DOCUMENTS

| | | | |
|---|---|---|---|
| DE | 2615913 A1 | 10/1977 | |
| DE | 9306418 U1 * | 7/1993 | ............... B23C 5/08 |
| DE | 10011113 A1 * | 9/2001 | ............... B23C 5/08 |
| DE | 202014102904 | 6/2014 | |
| EP | 0404110 A2 * | 12/1990 | ........... B23C 5/2441 |
| JP | 2013-111699 A * | 6/2013 | ............... B23C 5/24 |
| SU | 1419827 A1 * | 8/1988 | ............... B23C 5/06 |
| SU | 1690968 A1 * | 11/1991 | ............... B23C 5/06 |
| TW | M424204 U | 3/2012 | |

OTHER PUBLICATIONS

Written Opinion dated Nov. 15, 2016, issued in PCT counterpart application (No. PCT/IL2016/050866).

* cited by examiner

ROTARY CUTTING TOOL HAVING AXIAL POSITION ADJUSTMENT ARRANGEMENT

FIELD OF THE INVENTION

The subject matter of the present application relates to rotary cutting tools having a plurality cutting insert retained circumferentially thereon, in general, and to such cutting tools with arrangements for adjusting the axial position of the cutting inserts, in particular.

BACKGROUND OF THE INVENTION

Rotary cutting tools, having a plurality of peripheral insert pockets with a cutting insert retained therein, can be provided with an adjustment mechanism for adjusting the axial position of any of said pockets and therefore the respective cutting insert seated therein. Examples of such rotary cutting tools are disclosed in, for example, U.S. Pat. No. 6,056,484, U.S. Pat. No. 8,092,124, U.S. Pat. No. 6,604,894, US 2013/0022414 and U.S. Pat. No. 6,030,153.

Moreover, if the rotary cutting tool is a slotting cutter, for example, axial position adjustment mechanisms can provide the ability to adjust the effective cutting width of the cutting tool, where the effective cutting width is defined by the overlapping span (in the axial direction) of all the cutting inserts of the rotary cutting tool. Examples of such rotary cutting tools are disclosed in, for example, US 2014/0178136, and U.S. Pat. No. 6,971,823, where the latter also includes cartridges for seating the inserts in the insert pockets.

It is an object of the subject matter of the present application to provide a rotary cutting tool with an adjustment mechanism for adjusting the axial position of any of the cutting inserts.

SUMMARY OF THE INVENTION

In accordance with a first aspect of the subject matter of the present application there is provided a rotary cutting tool, having a tool longitudinal axis, defining a forward to rearward direction and about which the rotary cutting tool is rotatable in a rotational direction, the rotary cutting tool comprising a tool holder comprising:
a holder peripheral surface extending circumferentially along the tool longitudinal axis and forming a boundary of a holder front surface at a holder forward end of the tool holder; and
an adjustment arrangement comprising a biasing member which is movably attached to the tool holder and comprises a biasing portion; and
a tool body, releasably attached to the tool holder at the holder forward end thereof, the tool body comprising:
opposing body forward and rearward surfaces and a body peripheral surface extending therebetween; and
a plurality of angularly spaced apart cutting portions, each comprising an insert pocket disposed at the body peripheral surface, the plurality of cutting portions comprising an adjustable cutting portion; wherein
the adjustable cutting portion is adjustable between a non-flexed position and a flexed position; and
in the flexed position, the adjustable cutting portion is elastically deformed in the forward direction due to biasing engagement with the biasing portion.

In accordance with a second aspect of the subject matter of the present application there is provided a rotary cutting tool having a tool longitudinal axis, defining a forward to rearward direction and about which the rotary cutting tool is rotatable in a rotational direction, the rotary cutting tool comprising a tool holder having a holder longitudinal axis;
a tool body having a body central axis, the tool body being releasably attached to a forward end of the tool holder with the body central axis and the holder longitudinal axis being coincident with the tool longitudinal axis;
at least one cutting insert mounted on the tool body; and
a lever pivotally mounted on the tool holder and configured to adjust an axial position of the at least one cutting insert mounted on the tool body.

It is understood that the above-said is a summary, and that features described hereinafter may be applicable in any combination to the subject matter of the present application, for example, any of the following features may be applicable to the rotary cutting tool:

In the non-flexed position, the body rearward surface located at the adjustable cutting portion defines a body plane that is perpendicular to the tool longitudinal axis; and in the flexed position, the biasing portion can extend further axially forward than the body plane.

The adjustable cutting portion can comprise a resilience recess that opens out at least to the body forward and rearward surfaces.

The resilience recess can open out to the body peripheral surface.

The resilience recess can open out to the body peripheral surface at a rotationally forward portion of the insert pocket of the adjustable cutting portion.

In a front view of the rotary cutting tool, the resilience recess can extend in a radial direction.

The holder front surface can comprise a holder abutment surface;

the holder front surface can comprise at least one holder threaded bore recessed therein;

the tool body can comprise at least one body through bore opening out to the body forward and rearward surfaces;

a retaining screw can be located in each body through bore and threadingly received in a respective holder threaded bore; and the holder abutment surface can abut a portion of the body rearward surface.

The plurality of cutting portions can further comprise a non-adjustable cutting portion that is not adjustable between the non-flexed position and the flexed position; and each body through bore can be located at a respective non-adjustable cutting portion.

The biasing member can be a lever pivotally attached to the tool holder.

The lever can comprise a lever actuating portion and a lever middle portion located between the biasing portion and the lever actuating portion;

the lever middle portion can comprise at least one lever pivot surface that is pivotally mounted at at least one fulcrum surface on the tool holder; and the lever can be configured such that the biasing portion comes into biasing engagement with the adjustable cutting portion when the lever is pivoted about a pivot axis by applying an actuating force at the lever actuating portion.

The at least one lever pivot surface can lie on part of an imaginary cylindrical surface, having a cylinder axis; and the pivot axis and the cylinder axis can be co-incident.

The adjustment arrangement can further comprise a lever channel recessed in the tool holder, the lever channel comprising two opposing lever channel side surfaces and a lever channel central surface extending therebetween; and the at least one fulcrum surface can be located in the lever channel.

The adjustment arrangement can further comprise an actuating member that can be configured to pivot the lever when actuated.

The actuating member can be an actuating screw.

The lever can comprise a lever through bore passing between the lever top and bottom surfaces;

The lever channel central surface can comprise an axially directed channel threaded hole recessed therein; and in the flexed position, the actuating screw can be located in the lever through bore and threadingly engaged in the channel threaded hole, thereby inducing the lever to pivot.

The tool body can comprise an access through bore, opening out to the body forward and rearward surfaces, for accessing the actuating screw; and The access through bore can be rotationally aligned with the actuating screw.

The lever can comprise a lever threaded hole;

the actuating screw comprises a screw contact surface at one end; and in the flexed position, the actuating screw is threadingly engaged in the lever threaded hole and the screw contact surface presses against the lever channel central surface, thereby inducing the lever to pivot.

The lever channel can be recessed in the holder front surface.

The lever channel can open out to the holder peripheral surface.

The lever can comprise two opposing lever end surfaces and a lever peripheral surface extending therebetween, the lever peripheral surface can comprise opposing lever top and bottom surfaces and two opposing lever side surfaces connecting the lever top and bottom surfaces;

the lever bottom surface can comprise a lever projection that can extend in a transverse direction between the two lever side surfaces;

the lever can comprise exactly one lever pivot surface that can be located on the lever projection;

the lever channel can comprise a channel groove, recessed in the lever channel central surface, that can extend in a transverse direction between the two lever channel side surfaces; and the lever channel can comprise exactly one fulcrum surface that is located in the channel groove.

The lever channel can extend in the radial direction.

The lever channel can be recessed in the holder peripheral surface and can open out to the holder front surface.

The lever can comprise two opposing lever end surfaces and a lever peripheral surface extending therebetween, the lever peripheral surface can comprise opposing lever top and bottom surfaces and two opposing lever side surfaces connecting the lever top and bottom surfaces;

the lever can comprise two lever arms extending away from the two opposing lever side surfaces, respectively, adjacent one of the lever end surfaces;

the lever can comprise exactly two lever pivot surfaces, one located on each lever arm;

the lever channel can comprise two channel grooves extending away from the two opposing lever channel side surfaces respectively, opening out to the holder front surface; and the lever channel can comprise exactly two fulcrum surface, one located in each channel groove.

The lever channel can extend in the axial direction.

In a flexed position; the lever may not extend beyond the holder peripheral surface in a radially outward direction.

In a side view of the rotary cutting tool:

the lever actuating portion can have a lever width;

a middle portion of the lever channel can have a lever channel width; and the lever channel width can be less than the lever width.

The adjustment arrangement can comprise a radial stopping member releasably attached to the tool holder;

the lever can comprise a cutout at one end thereof; and the radial stopping member can be configured such that the radial stopping member obstructs the path of the lever at the cutout when the lever is displaced in a radially outward direction.

The tool body can be disc-shaped.

The rotary cutting tool can be a slotting cutter.

The plurality of cutting portions can further comprise a non-adjustable cutting portion that is not adjustable between the non-flexed position and the flexed position.

The plurality of cutting portions can comprise a plurality of adjustable cutting portions and a plurality of non-adjustable cutting portions;

the rotary cutting tool can comprise a plurality of adjustment arrangements; and the plurality of adjustable cutting portions and the plurality of non-adjustable cutting portions can be arranged alternately along body peripheral surface.

The insert pockets of each adjustable cutting portion can open out laterally at the body forward surface and the insert pockets of each non-adjustable cutting portion can open out laterally at the body rearward surface.

The tool body can be reversible.

The lever can comprise a biasing portion, a lever actuating portion and a lever middle portion located therebetween;

the lever middle portion can comprise at least one lever pivot surface that is pivotally mounted at at least one fulcrum surface on the tool holder; and the lever can be configured such that the biasing portion comes into biasing engagement with a portion of the tool body when the lever is pivoted about a pivot axis by applying an actuating force at the lever actuating portion.

The tool holder can comprise a holder peripheral surface extending circumferentially along the tool longitudinal axis and forming a boundary of a holder front surface at a holder forward end of the tool holder; and the rotary cutting tool can further comprise a lever channel recessed in the tool holder at the holder front surface, the lever channel comprising two opposing lever channel side surfaces and a lever channel central surface extending therebetween; and the at least one fulcrum surface can be located in the lever channel.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
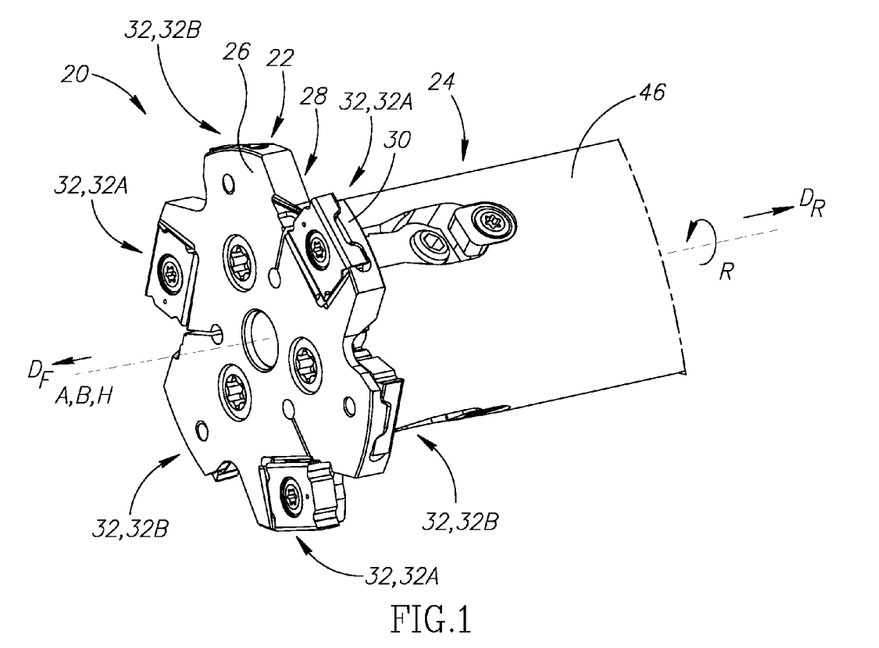
FIG. 1 is a perspective view of a rotary cutting tool in accordance with a first embodiment of the present application.
Figure 2:
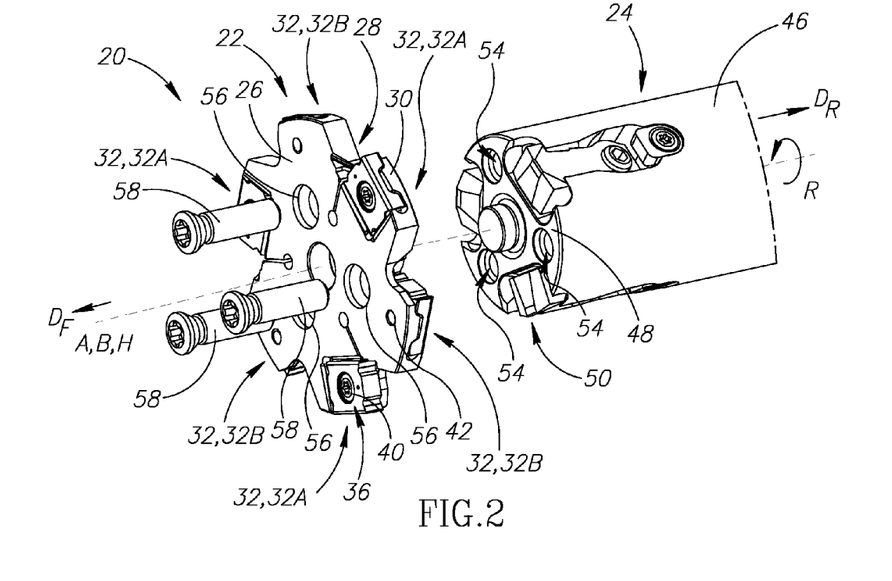
FIG. 2 is an exploded perspective view of the rotary cutting tool shown in FIG. 1.

Attention is first drawn to FIGS. 1 and 2 showing a rotary cutting tool 20, depicting an aspect of the present application. In this non-limiting example shown in the drawings, the rotary cutting tool 20 is a milling cutting tool. In particular the milling cutting tool is a slotting cutter, suitable for slotting cutting operations. However, the subject matter of the present application is not restricted only to slotting cutters and could also be applicable to, for example but not limited to, face milling cutters. The rotary cutting tool 20 has a tool longitudinal axis A, defining a forward to rearward direction $D_F$, $D_R$ and about which the rotary cutting tool 20 is rotatable in a rotational direction R. In this non-limiting example shown in the drawings the rotary cutting tool 20 is a right handed rotary cutting tool. The rotary cutting tool 20 has a tool body 22 which can be typically made from steel. The rotary cutting tool 20 also has an tool holder 24, which is complementary to the tool body 22. The tool holder 24 can also be typically made from steel.

It is noted that the term "slotting cutter" as used herein may be replaced with other terms applicable in the metal cutting field for such cutting tools, for example, "slot milling cutter", "slitting cutter", "grooving cutter", "slot mill cutter", "groove milling cutter", "side milling cutter", "disc milling cutter", and the like.

Figure 3:
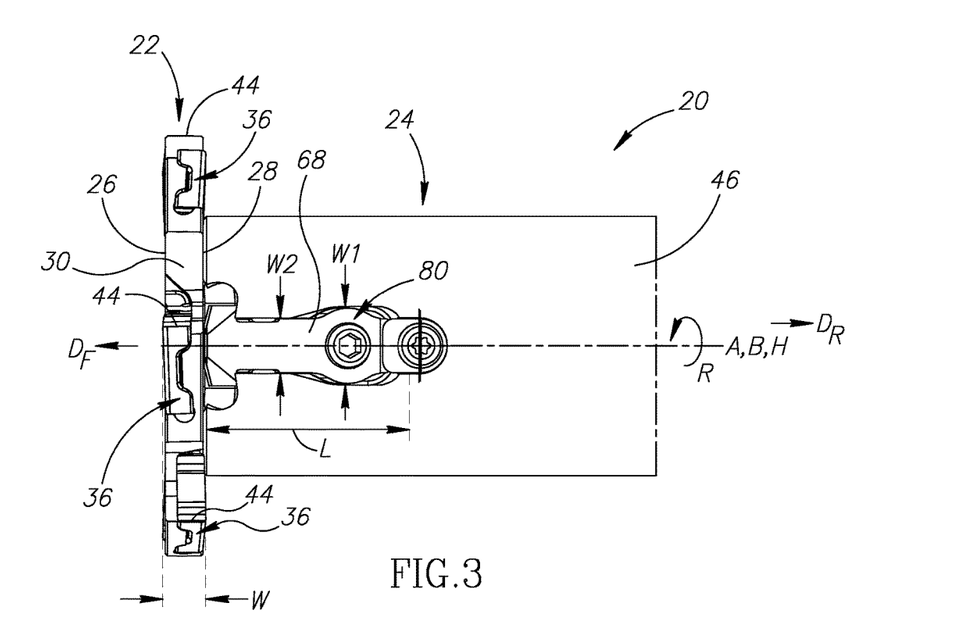
FIG. 3 is a side view of the rotary cutting tool shown in FIGS. 1 and 2.

It should also be noted that use of the terms "forward" and "rearward" throughout the description and claims refer to a relative position in a direction of the tool longitudinal axis A towards the left and right, respectively, in FIG. 3. In the present disclosure, "forward" is associated with the cutting end of the tool.

It should also further be noted that use of the terms "axial" and "radial" throughout the description and claims are with respect to the tool longitudinal axis A, unless otherwise stated.

Figure 4:
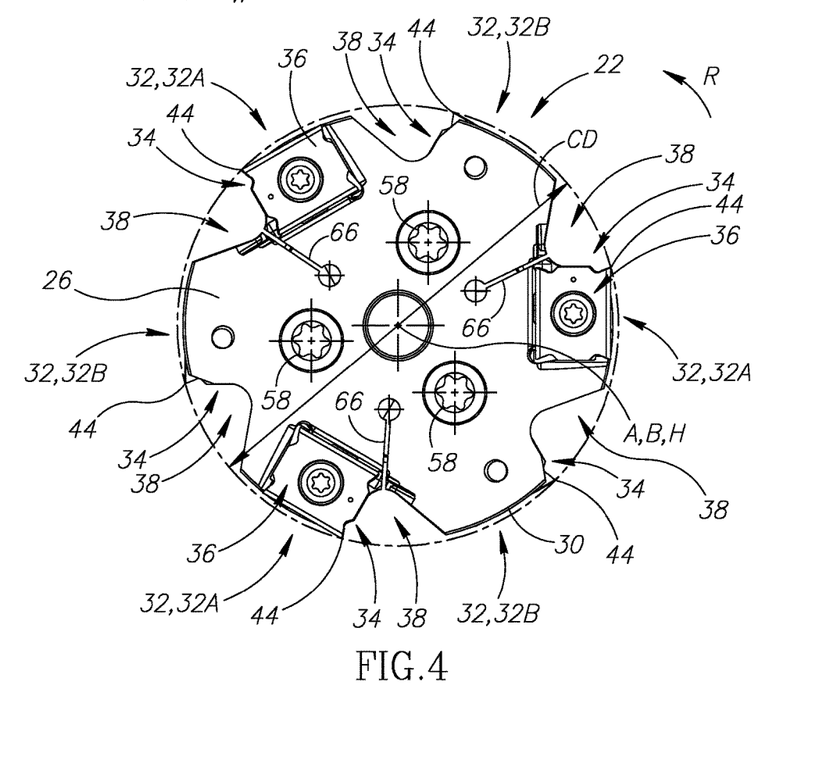
FIG. 4 is a front view of the rotary cutting tool shown in FIG. 3.

Reference is now made to FIGS. 3 and 4. The tool body 22 has a body central axis B, about which the tool body 22 is rotatable in the rotational direction R. When the tool body 22 is releasably attached to the tool holder 24, the body central axis B is co-incident with the tool longitudinal axis A. The tool body 22 includes body forward and rearward surfaces 26, 28 and a body peripheral surface 30 that extends between the body forward and rearward surfaces 26, 28. The body central axis B extends through the body forward and rearward surfaces 26, 28. In accordance with some embodiments of the subject matter of the present application, the forward and rearward surfaces 26, 28 can be parallel to each other. The tool body 22 can have a disc shape. The tool body 22 can have rotational symmetry about the body central axis B. In this non-limiting example shown in the drawings, the tool body 22 can have 3-fold rotational symmetry about the body central axis B.

As shown particularly in FIG. 4, the tool body 22 includes a plurality of cutting portions 32. The plurality of cutting portions 32 are angularly spaced apart, about the tool longitudinal axis A, preferably equally. Each cutting portion 32 includes an insert pocket 34 disposed at the body peripheral surface 30. Each insert pocket 34 is configured to retain a cutting insert 36. In this non-limiting example shown in the drawings, a chip gullet 38 can be provided adjacent to each insert pocket 34 in the rotational direction R in order to aid chip evacuation. In accordance with some embodiments of the subject matter of the present application, the tool body 22 can be made from a unitary integral one-piece construction and each cutting insert 36 can be seated directly on the tool body 22, in the respective insert pocket 34. Alternatively, in accordance with some other embodiments of the subject matter of the present application, each cutting insert 36 can be seated indirectly on the tool body 22, in an insert pocket 34 formed in a respective insert cartridge (not shown) that is releasably attached to the tool body 22.

Reverting back to FIG. 2, each cutting insert 36 can be firmly retained in the respective insert pocket 34, for example, by an insert screw 40, threadingly engaged with a respective insert screw bore 42. Each insert screw bore 42 may open out to at least one of the body forward and rearward surfaces 26, 28. Each cutting insert 36 has a respective cutting edge 44. When each cutting insert 36 is retained in the respective insert pocket 34, the cutting edge 44 can assume an axial position, i.e., in a direction generally parallel to the tool longitudinal axis A.

Reverting to FIG. 3, the rotary cutting tool 20 is employed for slot cutting in a metal work piece. A width of cut W, is determined by the overlapping span (in the axial direction) of all the cutting inserts 36 of the rotary cutting tool 20 (i.e., in a direction parallel to the tool longitudinal axis A). Controlling the width of cut W of the rotary cutting tool 20 may be achieved by adjusting the axial position of at least one of the cutting edges 44. It should be noted that it is not mandatory to adjust the axial position of all the cutting inserts 36 in order to adjust the width of cut W. It is also noted, as seen in FIG. 4, when the tool body 22 has a disc shape, the plurality of cutting edges 44 can define a cutting diameter CD about the tool longitudinal axis A.

Figure 5:
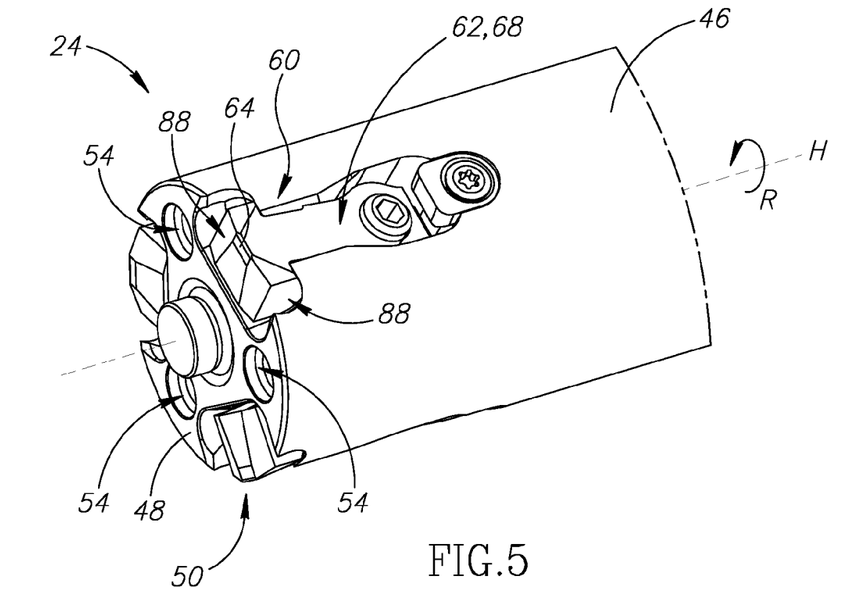
FIG. 5 is a perspective view of a tool holder shown in FIGS. 1 and 2.
Figure 6:
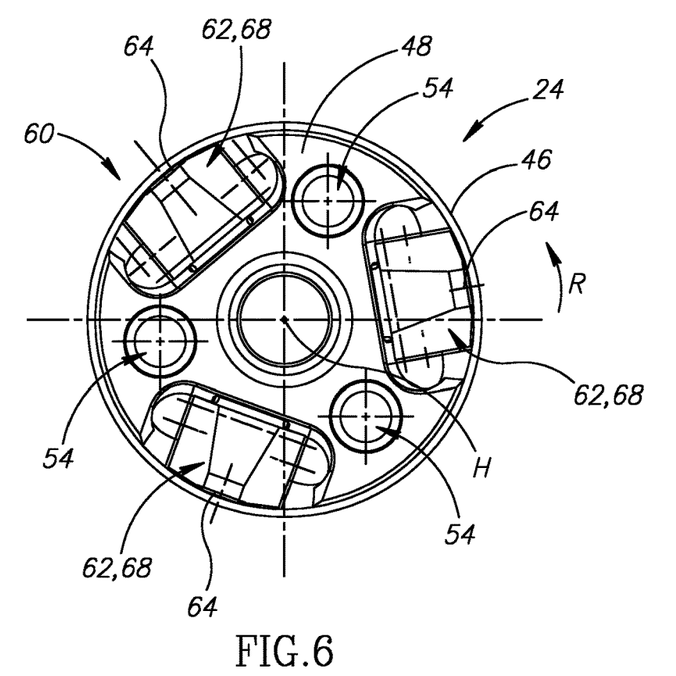
FIG. 6 is a front view of the tool holder shown in FIG. 5.

Reference is now made to FIGS. 5 and 6, showing the tool holder 24. The tool holder 24 has a holder longitudinal axis H, about which the tool holder 24 is rotatable in the rotational direction R. When the tool body 22 is releasably attached to the tool holder 24, the holder longitudinal axis H is co-incident with the tool longitudinal axis A. The tool holder 24 includes a holder peripheral surface 46 that extends circumferentially along the tool longitudinal axis A. The holder peripheral surface 46 forms a boundary of a holder front surface 48 at a holder forward end 50 of the tool holder 24. The holder longitudinal axis H extends through the holder front surface 48. The tool holder 24 can be elongated in the direction of the tool longitudinal axis A. The tool holder 24 can have rotational symmetry about the holder longitudinal axis H. In this non-limiting example shown in the drawings, the tool holder 24 can have 3-fold rotational symmetry about the holder longitudinal axis H. It should also be noted that the holder peripheral surface 46 of the tool holder 24 is offset in the radially inward direction relative to the cutting inserts 36, thus allowing for a slot to be cut, without the tool holder 24 interfering with the work piece.

Reverting back to FIGS. 1 and 2, the tool body 22 is releasably attached to tool holder 24 at the holder forward end 50 thereof. In accordance with some embodiments of the subject matter of the present application, the holder front surface 48 can include a holder abutment surface 52. The holder front surface 48 can include at least one holder threaded bore 54 that is recessed therein. The tool body 22 can include at least one body through bore 56 that opens out to the body forward and rearward surfaces 26, 28. A retaining screw 58 can be located in each body through bore 56 and threadingly received in a respective holder threaded bore 54. The holder abutment surface 52 can abut a portion of the body rearward surface 28.

In accordance with some embodiments of the subject matter of the present application, the tool body 22 is reversible. That is to say, the body forward surface 26 can function as the body rearward surface 28 (and vice versa) and when the tool body 22 and the tool holder 24 are releasably attached together the holder abutment surface 52 can abut a portion of the body forward surface 26. In such a configuration the rotary cutting tool 20 becomes a left-handed rotary cutting tool, with the rotational direction being reversed.

Referring again to FIGS. 5 and 6, the tool holder 24 includes an adjustment arrangement 60, for adjusting the axial position of a respective insert pocket 34, and therefore the axial position of the cutting insert 36 seated in the respective insert pocket 34. The adjustment arrangement 60 includes a biasing member 62. The biasing member 62 includes a biasing portion 64. The biasing member 62 is movably attached to the tool holder 24. The biasing portion 64 is moveable relative to the holder front surface 48. In accordance with some embodiments of the subject matter of the present application, the biasing member 62 can be releasably attached to the tool holder 24. In a front view of the tool holder 24 (i.e. FIG. 6), the biasing portion 64 can located at the periphery of the tool holder 24 (i.e. adjacent the holder peripheral surface 46). It is pointed out that the biasing member 62 may not be integrally formed with the tool holder 24. Clearly, the biasing member 62 is not integrally formed with the tool body 22.

The plurality of cutting portions 32 includes an adjustable cutting portion 32A. The adjustable cutting portion 32A is rotationally aligned with the adjustment arrangement 60 and can be considered to be associated therewith. The adjustable cutting portion 32A is adjustable between a non-flexed position and a flexed position by the adjustment arrangement 60. When the adjustable cutting portion 32A is in the non-flexed position the adjustable cutting portion 32A may not be in biasing engagement with the biasing portion 64 and is not elastically deformed. The body rearward surface 28 located at the adjustable cutting portion 32A defines a body plane BP that is perpendicular to the tool longitudinal axis A. When the adjustable cutting portion 32A is in the flexed position, the biasing portion 64 extends further axially forward than the body plane BP. Thus the adjustable cutting portion 32A is elastically deformed in the forward direction $D_F$ due to biasing engagement with the biasing portion 64. The method of adjusting the adjustable cutting portion 32A between the non-flexed position and the flexed position is described in detail further in the description.

In accordance with some embodiments of the subject matter of the present application, the plurality of cutting portions 32 can include a non-adjustable cutting portion 32B that is not adjustable between the non-flexed position and the flexed position. The non-adjustable cutting portion 32B is not associated with any adjustment arrangement 60. When the tool body 22 is releasably attached to the tool holder 24, each body through bore 56, and each retaining screw 58, can be located at a respective non-adjustable cutting portion 32B. Thus, the adjustable cutting portion 32A is free to be flexed.

In accordance with some embodiments of the subject matter of the present application, the plurality of cutting portions 32 can include at least one additional adjustable cutting portion 32A thus forming a plurality of adjustable cutting portions 32A. The plurality of cutting portions 32 can include at least one additional non-adjustable cutting portion 32B thus forming a plurality of non-adjustable cutting portions 32B. The tool holder 24 can include at least one additional adjustment arrangement 60 to form a plurality of adjustment arrangements 60. Each adjustment arrangement 60 is associated with a respective adjustable cutting portion 32A. The plurality of adjustable cutting portions 32A and the plurality of non-adjustable cutting portions 32B can be arranged alternately along the body peripheral surface 30. The insert pocket 34 of each adjustable cutting portion 32A can open out laterally at the body forward surface 26 and the insert pocket 34 of each non-adjustable cutting portion 32B can open out laterally at the body rearward surface 28.

It should be noted that it is not mandatory to adjust the axial position of the cutting inserts 36 of all the adjustable cutting portions 32A, even if each adjustable cutting portion 32A is associated with a respective adjustment arrangement 60.

It should also be noted that any feature in the description that relates to the adjustable cutting portion 32A can optionally also relate to any other one of the plurality of adjustable cutting portions 32A. Likewise, any feature in the description that relates to the non-adjustable cutting portion 32B can optionally also relate to any other one of the plurality of non-adjustable cutting portions 32B, and any feature in the description that relates to the adjustment arrangement 60 can optionally also relate to any other one of the plurality of adjustable cutting portions 60.

Attention is drawn to FIGS. 1 to 2, and 4. In accordance with some embodiments of the subject matter of the present application, the adjustable cutting portion 32A can include a resilience recess 66. The resilience recess 66 is designed to allow the adjustable cutting portion 32A to be flexed by a biasing force BF applied by the biasing portion 64. The resilience recess 66 can open out at least to the body forward and rearward surfaces 26, 28. The resilience recess 66 can also open out to the body peripheral surface 30. In a particular embodiment, the resilience recess 66 can open out to the body peripheral surface 30 at a rotationally forward portion of the insert pocket 34 of the adjustable cutting portion 32A.

As shown in FIG. 4, in some embodiments, in a front view of the rotary cutting tool 20, the resilience recess 66 can extend in a radial direction. The non-adjustable cutting portion 32B can be devoid of a resilience recess 66, since it is not associated with an adjustment arrangement 60 and not designed to be flexed. The resilience recess 66 can be formed between the adjustable cutting portion 32A and the adjacent non-adjustable cutting portion 32B in the rotational direction R. The resilience recess 66 can extend radially inwardly to a region on the tool body 22 distanced from the body central axis B by a distance approximately one third of the radius associated with the cutting diameter CD.

Figure 7:
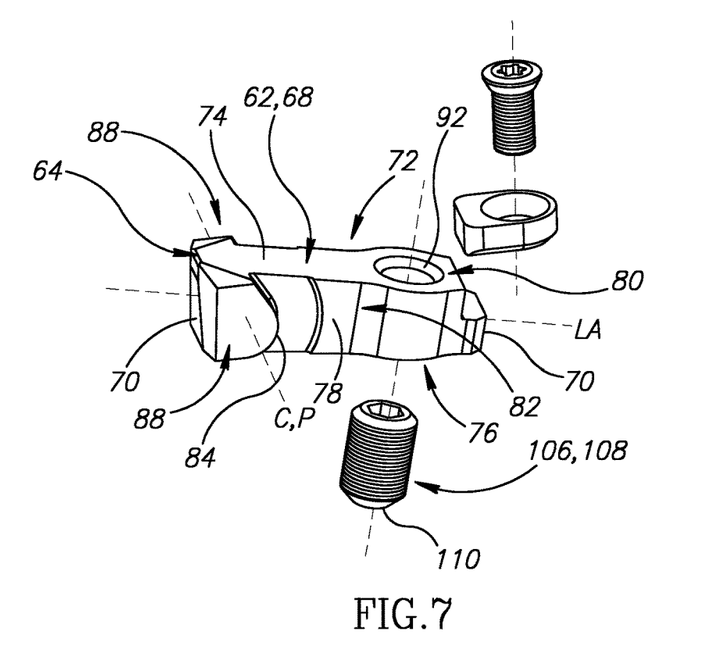
FIG. 7 is an exploded perspective view of the lever shown in FIG. 5.

Reference is now made to FIG. 7. In accordance with some embodiments of the subject matter of the present application, the biasing member 62 can be a lever 68 pivotally attached to the tool holder 24. The lever 68 can be made of steel. The lever 68 can extend longitudinally along a lever longitudinal axis LA. The lever 68 can include two opposing lever end surfaces 70, intersected by the lever longitudinal axis LA, and a lever peripheral surface 72 extending between the lever end surfaces 70. The lever peripheral surface 72 can include opposing lever top and bottom surfaces 74, 76 and two opposing lever side surfaces 78 connecting the lever top and bottom surfaces 74, 76. The lever 68 can include a lever actuating portion 80 and a lever middle portion 82 located between the biasing portion 64 and the lever actuating portion 80. The biasing portion 64 can be located at one end of the lever 68, and the lever actuating portion 80 can be located at the other end of the lever 68. The lever middle portion 82 can include at least one lever pivot surface 84 that can be designed to be pivotally mounted at at least one fulcrum surface 84 on the tool holder 24.

In accordance with some embodiments of the subject matter of the present application, the lever 68 can be configured such that the biasing portion 64 can come into biasing engagement with the adjustable cutting portion 32A when the lever 68 is pivoted about a pivot axis P by applying an actuating force AF at the lever actuating portion 80. That is to say, the biasing portion 64 can apply a biasing force BF on the adjustable cutting portion 32A when the lever 68 is pivoted. The direction of the biasing force BF can be substantially parallel to the tool longitudinal axis A. The pivot axis P can be perpendicular to the tool longitudinal axis A. The at least one lever pivot surface 84 can lie on part of an imaginary cylindrical surface CS that has a cylinder axis C. The pivot axis P and the cylinder axis C can be co-incident. Likewise, the at least one lever fulcrum surface 84 can lie on the imaginary cylindrical surface CS. Thus, the at least one fulcrum surface 84 and the at least one pivot surface 84 can slide smoothly over each other when the lever 68 is pivoted about the pivot axis P.

As further shown in FIGS. 5 and 7, in accordance with a first embodiment of the subject matter of the present application, the lever 68 can include two lever arms 88 that extend away from the two opposing lever side surfaces 78, respectively, adjacent one of the lever end surfaces 70. Referring just to FIG. 7, the lever 68 can include exactly two lever pivot surfaces 84, one located on each lever arm 88. The lever 68 can include a lever threaded hole 92. The lever threaded hole 92 is used for pivoting the lever 68 and is described in detail further in the description.

Figure 11:
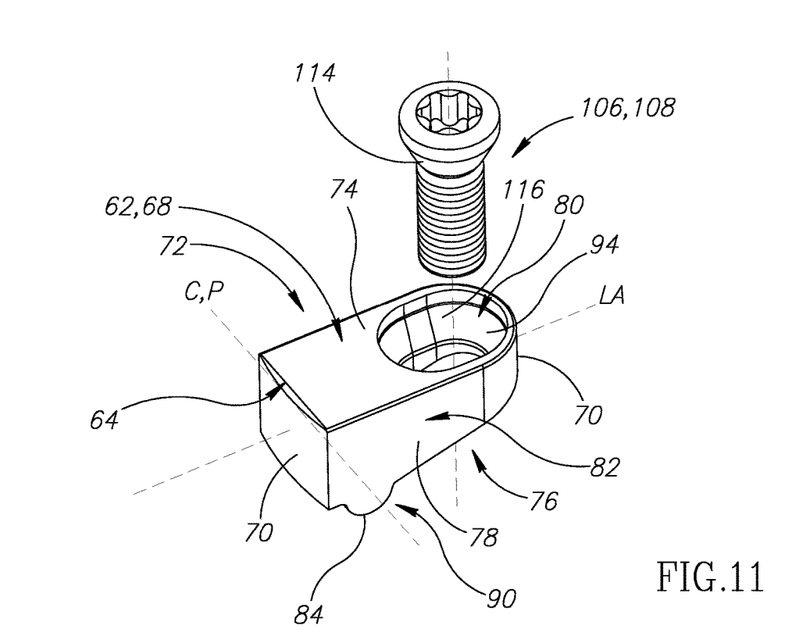
FIG. 11 is an exploded perspective view of the lever shown in FIG. 10.

As shown in FIG. 11, in accordance with a second embodiment of the subject matter of the present application, the lever bottom surface 76 can include a lever projection 90 that extends in a transverse direction (i.e., transverse to the lever longitudinal axis LA) between the two lever side surfaces 78. The lever 68 can include exactly one lever pivot surface 84 that is located on the lever projection 90. The lever 68 can include a lever through bore 94 passing between the lever top and bottom surfaces 74, 76. The lever through bore 94 is used for pivoting the lever 68 and is described in detail further in the description.

In accordance with some embodiments of the subject matter of the present application, the adjustment arrangement 60 can further include a lever channel 96 which is designed to accommodate the lever 68. The lever channel 96 is recessed in the tool holder 24 at the holder front surface 48. The lever channel 96 can extend longitudinally. The lever channel 96 can include two opposing lever channel side surfaces 98 and a lever channel central surface 100 that extends between the two lever channel side surfaces 98. The at least one fulcrum surface 84 can be located in the lever channel 96.

Figure 5A:
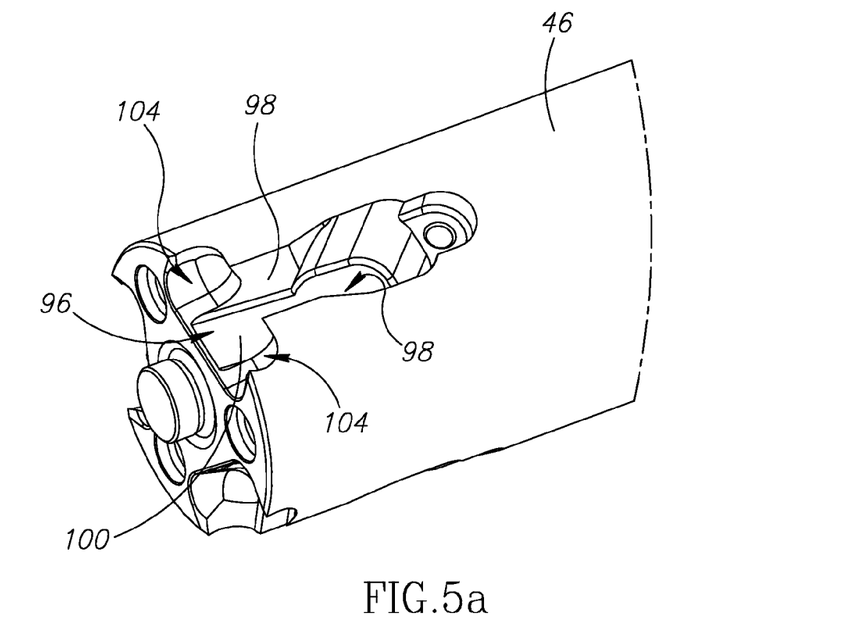
FIG. 5a is the tool holder in FIG. 5 with a lever removed.

As seen in FIG. 5a, in accordance with the first embodiment of the subject matter of the present application, the lever channel 96 can be recessed in the holder peripheral surface 46 and can open out to the holder front surface 48. The lever channel 96 can extend in the axial direction with respect to the tool longitudinal axis A.

Figure 10:
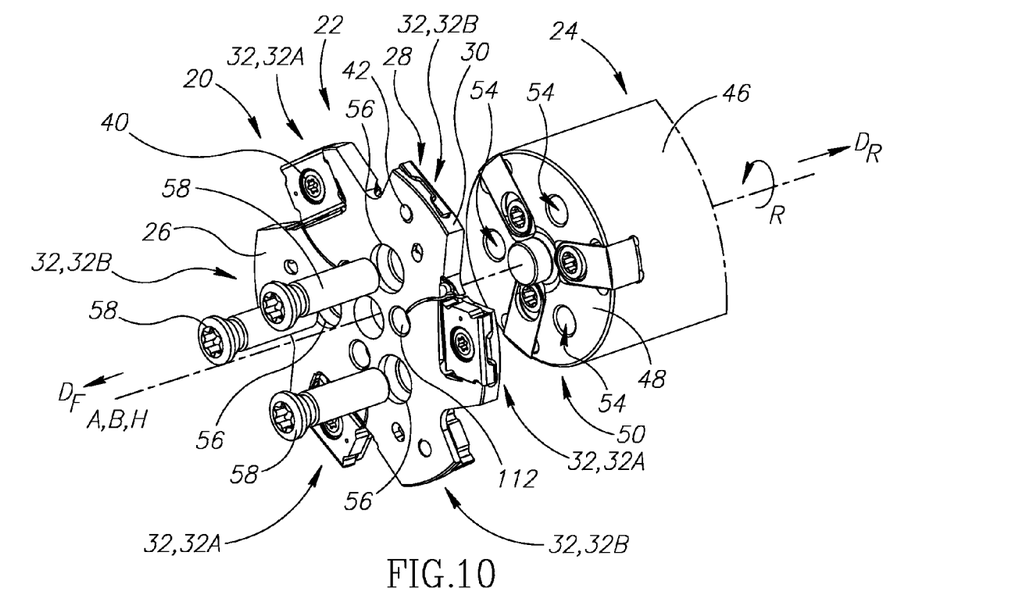
FIG. 10 is an exploded perspective view of a cutting tool in accordance with a second embodiment of the present application.
Figure 10A:
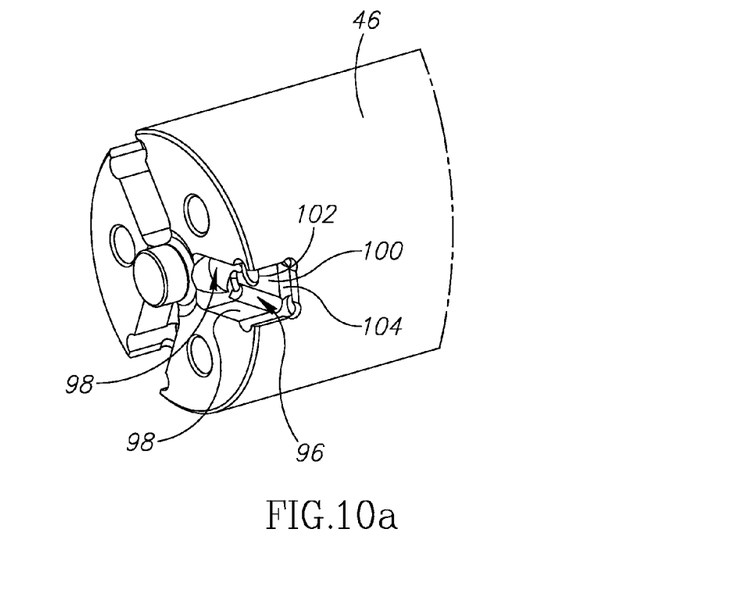
FIG. 10a is the tool holder in FIG. 10 with the lever removed.

As seen in FIG. 10a, in accordance with the second embodiment of the subject matter of the present application, the lever channel 96 can be recessed in the holder front surface 48. The lever channel 96 can open out to the holder peripheral surface 46. The lever channel 96 can extend in the radial direction with respect to the tool longitudinal axis A. The lever channel central surface 100 can include an axially directed channel threaded hole 102 recessed in the lever channel central surface 100. The purpose of the channel threaded hole 102 is described in detail further in the description. Unlike the first embodiment, in the configuration of the second embodiment, the length L of the lever channel 96, and thus the lever 68, is limited by the radial dimension of the holder front surface 48.

In accordance with some embodiments of the subject matter of the present application, the lever channel 96 can include at least one channel groove 104.

In accordance with the first embodiment of the subject matter of the present application, the lever channel 96 can include two channel grooves 104 that extend away from the two opposing lever channel side surfaces 98 respectively, and open out to the holder front surface 48. The two channel grooves 104 can open out to the holder peripheral surface 46. The lever channel 96 can include exactly two fulcrum surface 86, one fulcrum surface 86 located at each channel groove 104.

In accordance with the second embodiment of the subject matter of the present application, the lever channel 96 can include one channel groove 104 that is recessed in the lever channel central surface 100. The channel groove 104 can extend in a transverse direction between the two lever channel side surfaces 98. The lever channel 96 can include exactly one fulcrum surface 86 that is located in the channel groove 104.

In accordance with some embodiments of the subject matter of the present application, the adjustment arrangement 60 can include an actuating member 106 that is configured to induce the lever 68 to pivot when actuated. The actuating member 106 can be an actuating screw 108.

Referring now to FIG. 10, in accordance with the second embodiment of the subject matter of the present application, the tool body 22 can include an access through bore 112 that opens out to the body forward and rearward surfaces 26, 28. The access through bore 112 can be rotationally aligned with the actuating screw 108, thereby providing for the actuating screw 108 to be accessible for the tightening and untightening thereof.

Figure 8:
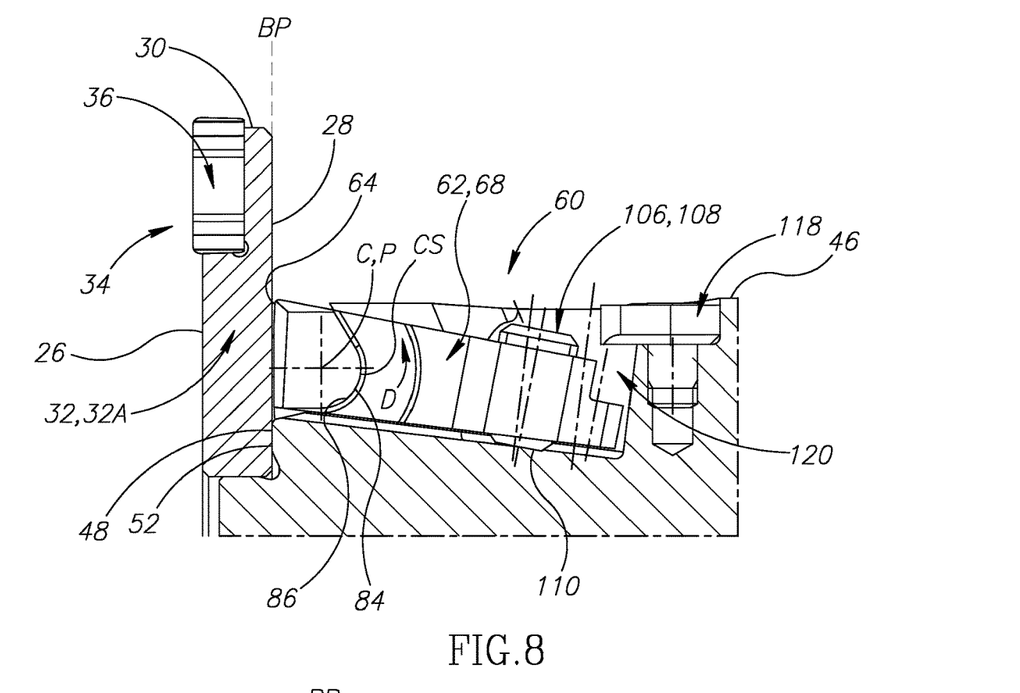
FIG. 8 is a detailed longitudinal cross-sectional view of the rotary cutting tool in FIG. 1, when an adjustable cutting portion is in a non-flexed position.

In accordance with the first embodiment of the subject matter of the present application, the actuating screw 108 can include a screw contact surface 110 at one end. Adjustment of the adjustable cutting portion 32A from a non-flexed position to a flexed position is accomplished by performing the following steps. The lever 68 is placed in the lever channel 96. The actuating screw 108 is threadingly engaged in the lever threaded hole 92 until the screw contact surface 110 initially contacts the lever channel central surface 100, defining the non-flexed position (see FIG. 8). In this position the biasing portion 64 is located axially rearward than the body plane BP. Further tightening of the actuating screw 108 urges the lever actuating portion 80 away from the lever channel central surface 100 and the lever 68 pivots about the pivot axis P in a rotational pivot direction D until the biasing portion 64 initially contacts the adjustable cutting portion 32A. In this position the screw contact surface 110 starts to press against the lever channel central surface 100. When the actuating screw 108 is further tightened, the lever 68 further pivots about the pivot axis P in the rotational pivot direction D. During this pivoting movement the biasing portion 64 is displaced in a direction having a forward component, until the biasing portion 64 extends further axially forward than the body plane BP, defining the flexed position (see FIG. 9). Thus, the adjustable cutting portion 32A is elastically deformed in the forward direction $D_F$ due to biasing engagement with the biasing portion 64. As seen from FIGS. 8 and 9, this biasing engagement is realized by the lever 68 and its biasing portion 64 pushing against the rearward surface 28 of the tool body 22, without directly contacting the cutting insert.

Figure 12:
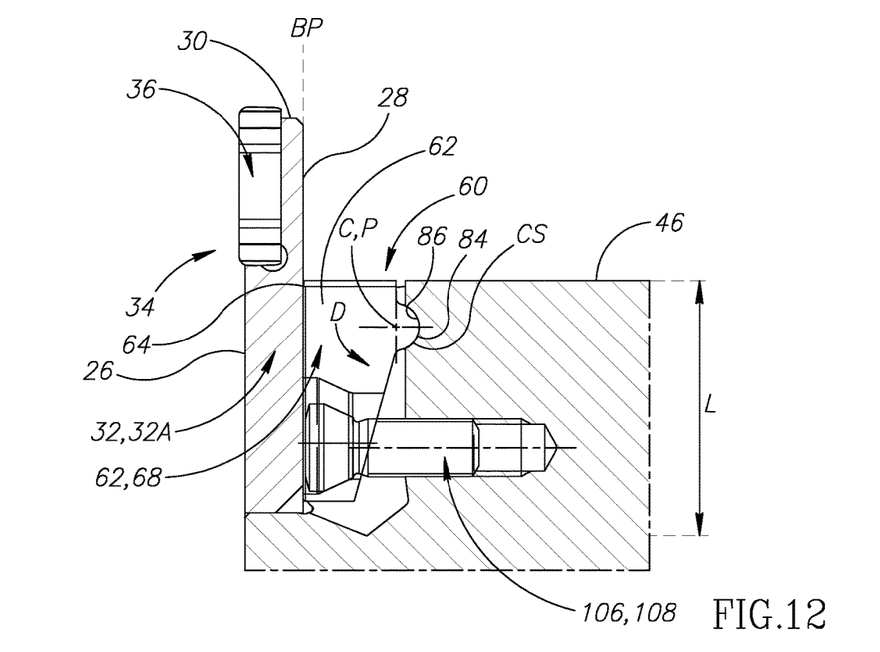
FIG. 12 is an analogous view shown in FIG. 8 of the rotary cutting tool in FIG. 10, when the adjustable cutting portion is in a non-flexed position.
Figure 13:
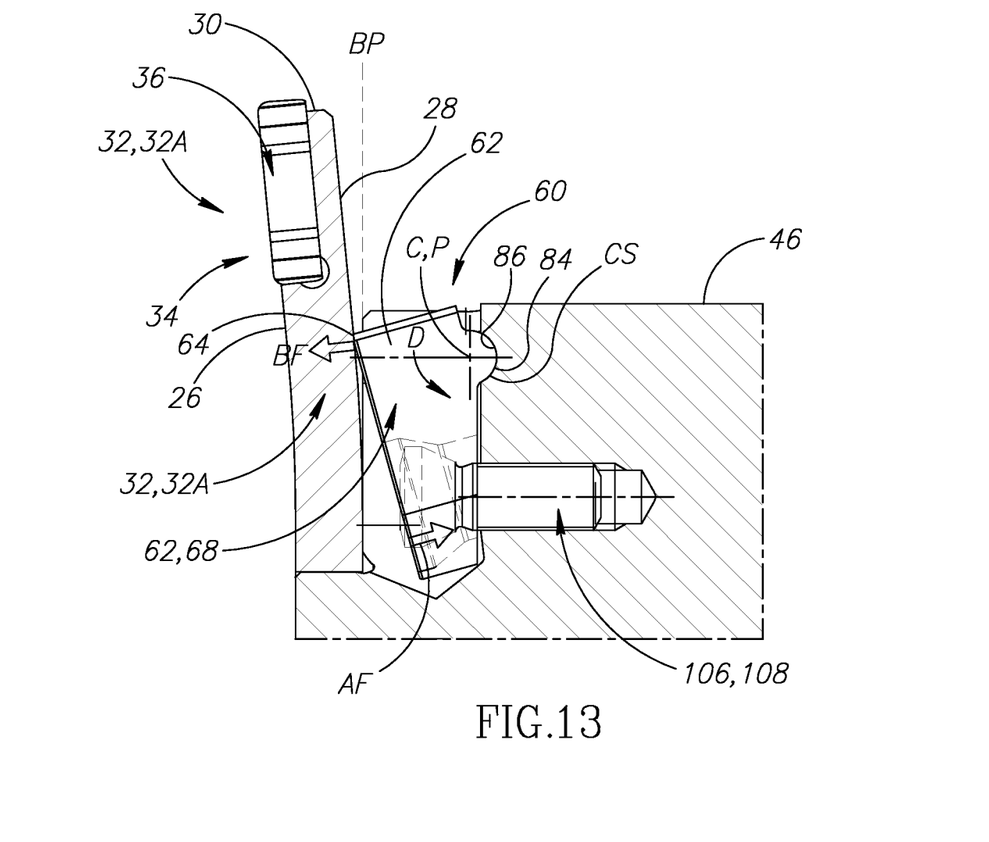
FIG. 13 is an analogous view shown in FIG. 12, when the adjustable cutting portion is in a flexed position.

In accordance with the second embodiment of the subject matter of the present application, the actuating screw 108 can include a screw head 114 and the lever through bore 94 can include a lever screw contact surface 116. Adjustment of the adjustable cutting portion 32A from a non-flexed position to a flexed position is accomplished by performing the following steps. The lever 68 is placed in the lever channel 96. The actuating screw 108 is located in the lever through bore 94 and threadingly engaged in the channel threaded hole 102, defining the non-flexed position (see FIG. 12). In this position the biasing portion 64 is located axially rearward than the body plane BP. Further tightening of the actuating screw 108 presses the screw head 114 against the lever screw contact surface 116 and urges the lever actuating portion 80 towards the lever channel central surface 100 so that the lever 68 pivots about the pivot axis P in the rotational pivot direction D until the biasing portion 64 initially contacts the adjustable cutting portion 32A. When the actuating screw 108 is further tightened, the lever 68 further pivots about the pivot axis P in the rotational pivot direction D. During this pivoting movement the biasing portion 64 is displaced in a direction having a forward component, until the biasing portion 64 extends further axially forward than the body plane BP, defining the flexed position (see FIG. 13). Thus, the adjustable cutting portion 32A is elastically deformed in the forward direction $D_F$ due to biasing engagement with the biasing portion 64.

Figure 9:
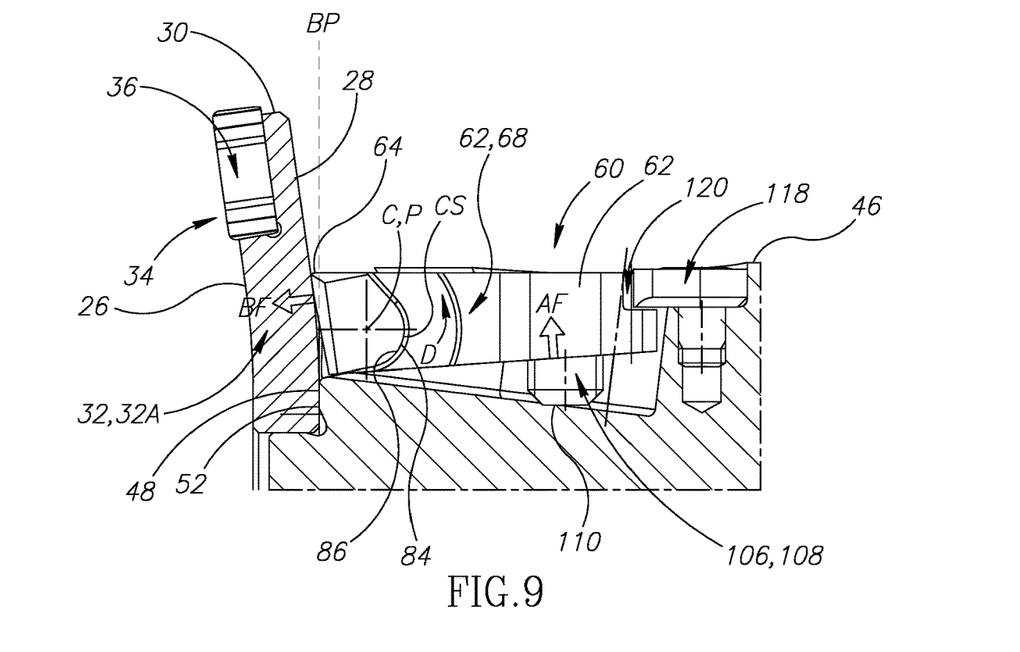
FIG. 9 is an analogous view shown in FIG. 8, when the adjustable cutting portion is in a flexed position.

In accordance with the first embodiment of the subject matter of the present application, the adjustment arrangement 60 can include a first mechanism to prevent axially forward displacement of the lever 68. The lever actuating portion 80 has a lever width W1. A middle portion of the lever channel 96 has a lever channel width W2. The lever channel width W2 can be less than the lever width W1, thus preventing displacement of the lever 68 in the axially forward direction. Moreover, the adjustment arrangement 60 can include a second mechanism to prevent radially outward displacement of the lever 68. As seen in FIG. 9, the adjustment arrangement 60 can include a radial stopping member 118 that is releasably attached to the tool holder 24. The lever 68 can include a cutout 120 at one end thereof. The radial stopping member 118 can be configured such that the radial stopping member 118 obstructs the path of lever 68 at the cutout 120 when the lever 68 is displaced in a radially outward direction.

It is noted that the adjustment arrangement 60, and in particular the biasing member 62, is not integral with, nor incorporated within, the tool body 22. That is to say, that the adjustment arrangement 60 is external from the tool body 22. This is advantageous when the rotary cutting tool 20 is small (for example. the cutting diameter CD is approximately 40 mm or less, where the width of cut W can be approximately 3 mm or less) since the tool body 22 does not have sufficient area to accommodate any kind of adjustment arrangement 60.

Thus, the rotary tool 20 has a tool longitudinal axis A of rotation and comprises: a first tool part (i.e., the tool holder 24) having a holder longitudinal axis H; a second tool part (i.e., the tool body 22) having a body central axis B; the tool body 22 being releasably attached to the tool holder 24 with the body central axis B and the holder longitudinal axis H being coincident with the tool longitudinal axis A; at least one cutting insert 36 mounted on the tool body 22; and a lever 68 pivotally mounted directly on the tool holder 24 and configured to adjust an axial position of the at least one cutting insert 36 mounted on the tool body 22.

It is further noted that in the flexed position, the lever 68 may not extend beyond the holder peripheral surface 46 (i.e. out of the lever channel 96) in a radially outward direction. Thus advantageously, the lever 68 does not interfere with the depth of cut of the rotary cutting tool 20.

It should also be noted that a feature of the subject matter of the present application is that the axial positioning of the cutting inserts 22 is very accurate. Thus, in slotting cutters the width of cut W of the rotary cutting tool 20 can be controlled very accurately.

Although the subject matter of the present application has been described to a certain degree of particularity, it should be understood that various alterations and modifications could be made without departing from the spirit or scope of the invention as hereinafter claimed.

What is claimed is:

1. A rotary cutting tool (20), having a tool longitudinal axis (A), defining a forward to rearward direction ($D_F$, $D_R$) and about which the rotary cutting tool (20) is rotatable in a rotational direction (R), the rotary cutting tool (20) comprising a tool holder (24) comprising:
   a holder peripheral surface (46) extending circumferentially along the tool longitudinal axis (A) and forming a boundary of a holder front surface (48) at a holder forward end (50) of the tool holder (24); and
   an adjustment arrangement (60) comprising a biasing member (62) which is movably attached to the tool holder (24) and comprises a biasing portion (64); and
a tool body (22), releasably attached to the tool holder (24) at the holder forward end (50) thereof, the tool body (22) comprising:
   opposing body forward and rearward surfaces (26, 28) and a body peripheral surface (30) extending therebetween; and
   a plurality of angularly spaced apart cutting portions (32), each comprising an insert pocket (34) disposed at the body peripheral surface (30), at least one of the plurality of cutting portions (32) comprising an adjustable cutting portion (32A); wherein
   the adjustable cutting portion (32A) is adjustable between a non-flexed position and a flexed position;
   in the non-flexed position, the body rearward surface (28) located at the adjustable cutting portion (32A) defines a body plane (BP) that is perpendicular to the tool longitudinal axis (A); and
   in the flexed position, the adjustable cutting portion (32A) is elastically deformed in the forward direction ($D_F$) due to the biasing portion (64) pushing against the body rearward surface (28) of the tool body (22) without directly contacting a cutting insert seated in the insert pocket (34), and the biasing portion (64) extends further axially forward than the body plane (BP).

2. The rotary cutting tool (20), according to claim 1, wherein the adjustable cutting portion (32A) comprises a resilience recess (66) that opens out at least to the body forward and rearward surfaces (26, 28).

3. The rotary cutting tool (20), according to claim 2, wherein the resilience recess (66) opens out to the body peripheral surface (30).

4. The rotary cutting tool (20), according to claim 3, wherein the resilience recess (66) opens out to the body peripheral surface (30) at a rotationally forward portion of the insert pocket (34) of the adjustable cutting portion (32A).

5. The rotary cutting tool (20), according to claim 2, wherein in a front view of the rotary cutting tool (20), the resilience recess (66) extends in a radial direction.

6. The rotary cutting tool (20), according to claim 1, wherein
   the holder front surface (48) comprises a holder abutment surface (52);
   the holder front surface (48) comprises at least one holder threaded bore (54) recessed therein;
   the tool body (22) comprises at least one body through bore (56) opening out to the body forward and rearward surfaces (26, 28);
   a retaining screw (58) is located in each body through bore (56) and threadingly received in a respective holder threaded bore (54); and
   the holder abutment surface (52) abuts a portion of the body rearward surface (28).

7. The rotary cutting tool (20), according to claim 6, wherein
   the plurality of cutting portions (32) further comprises a non-adjustable cutting portion (32B) that is not adjustable between the non-flexed position and the flexed position; and
   each body through bore (56) is located at a respective non-adjustable cutting portion (32B).

8. The rotary cutting tool (20), according to claim 1, wherein the tool body (22) is reversible, whereby the rotational direction is also reversed.

9. The rotary cutting tool (20), according to claim 1, wherein the biasing member (62) is a lever (68) pivotally attached to the tool holder (24).

10. The rotary cutting tool (20), according to claim 9, wherein
   the lever (68) comprises a lever actuating portion (80) and a lever middle portion (82) located between the biasing portion (64) and the lever actuating portion (80);
   the lever middle portion (82) comprises at least one lever pivot surface (84) that is pivotally mounted at at least one fulcrum surface (86) on the tool holder (24); and
   the lever (68) is configured such that the biasing portion (64) comes into biasing engagement with the adjustable cutting portion (32A) when the lever (68) is pivoted about a pivot axis (P) by applying an actuating force (AF) at the lever actuating portion (80).

11. The rotary cutting tool (20), according to claim 10, wherein
   the at least one lever pivot surface (84) lies on part of an imaginary cylindrical surface (CS), having a cylinder axis (C); and
   the pivot axis (P) and the cylinder axis (C) are coincident.

12. The rotary cutting tool (20), according to claim 9, wherein
   the adjustment arrangement (60) further comprises a lever channel (96) recessed in the tool holder (24) at the holder front surface (48), the lever channel (96) comprising two opposing lever channel side surfaces (98) and a lever channel central surface (100) extending therebetween; and
   the at least one fulcrum surface (86) is located in the lever channel (96).

13. The rotary cutting tool (20), according to claim 12, wherein the adjustment arrangement (60) further comprises an actuating member (106) that is configured to pivot the lever (68) when actuated.

14. The rotary cutting tool (20), according to claim 13, wherein the actuating member (106) is an actuating screw (108).

15. The rotary cutting tool (20), according to claim 14, wherein
   the lever (68) comprises a lever threaded hole (92);
   the actuating screw (108) comprises a screw contact surface (110) at one end; and
   in the flexed position, the actuating screw (108) is threadingly engaged in the lever threaded hole (92) and the screw contact surface (110) presses against the lever channel central surface (100), thereby inducing the lever (68) to pivot.

16. The rotary cutting tool (20), according to claim 14, wherein
   the lever (68) comprises a lever through bore (94) passing between lever top and bottom surfaces (74, 76);
   the lever channel central surface (100) comprises a channel threaded hole (102) recessed therein, the channel threaded hole extending along the tool longitudinal axis (A); and
   in the flexed position, the actuating screw (108) is located in the lever through bore (94) and threadingly engaged in the channel threaded hole (102), thereby inducing the lever (68) to pivot.

17. The rotary cutting tool (20), according to claim 16, wherein
the tool body (22) comprises an access through bore (112), opening out to the body forward and rearward surfaces (26, 28), for accessing the actuating screw (108); and
the access through bore (112) is rotationally aligned with the actuating screw (108).

18. The rotary cutting tool (20), according to claim 12, wherein the lever channel (96) is recessed in the holder peripheral surface (46) and opens out to the holder front surface (48).

19. The rotary cutting tool (20), according to claim 12, wherein
the lever (68) comprises two opposing lever end surfaces (70) and a lever peripheral surface (72) extending therebetween, the lever peripheral surface (72) comprising opposing lever top and bottom surfaces (74, 76) and two lever opposing side surfaces (78) connecting the lever top and bottom surfaces (74, 76);
the lever (68) comprises two lever arms (88) extending away from the two opposing lever side surfaces (78), respectively, adjacent one of the lever end surfaces (70);
the lever (68) comprises exactly two lever pivot surfaces (84), one located on each lever arm (88);
the lever channel (96) comprises two channel grooves (104) extending away from the two opposing lever channel side surfaces (98) respectively, opening out to the holder front surface (48); and
the lever channel (96) comprises exactly two fulcrum surfaces (86), one located in each channel groove (104).

20. The rotary cutting tool (20), according to claim 12, wherein the lever channel (96) extends in the axial direction.

21. The rotary cutting tool (20), according to claim 12, wherein in a flexed position;
the lever (68) does not extend beyond the holder peripheral surface (46) in a radially outward direction.

22. The rotary cutting tool (20), according to claim 12, wherein the lever channel (96) is recessed in the holder front surface (48).

23. The rotary cutting tool (20), according to claim 22, wherein the lever channel (96) opens out to the holder peripheral surface (46).

24. The rotary cutting tool (20), according to claim 12, wherein
the lever (68) comprises two opposing lever end surfaces (70) and a lever peripheral surface (72) extending therebetween, the lever peripheral surface (72) comprising opposing lever top and bottom surfaces (74, 76) and two opposing lever side surfaces (78) connecting the lever top and bottom surfaces (74, 76);
the lever bottom surface (76) comprises a lever projection (90) that extends in a transverse direction between the two lever side surfaces (78);
the lever (68) comprises exactly one lever pivot surface (84) that is located on the lever projection (90);
the lever channel (96) comprises a channel groove (104), recessed in the lever channel central surface (100), that extends in a transverse direction between the two lever channel side surfaces (98); and
the lever channel (96) comprises exactly one fulcrum surface (86) that is located in the channel groove (104).

25. The rotary cutting tool (20), according to claim 12, wherein the lever channel (96) extends in the radial direction.

26. The rotary cutting tool (20), according to claim 12, wherein:
the lever (68) comprises a lever actuating portion (80) and a lever middle portion (82) located between the biasing portion (64) and the lever actuating portion (80); and in a side view of the rotary cutting tool (20):
the lever actuating portion (80) has a lever width (W1);
a middle portion of the lever channel (96) has a lever channel width (W2); and
the lever channel width (W2) is less than the lever width (W1).

27. The rotary cutting tool (20), according to claim 12, wherein
the adjustment arrangement (60) comprises a radial stopping member (118) releasably attached to the tool holder 24;
the lever (68) comprises a cutout (120) at one end thereof; and
the radial stopping member (118) is configured such that the radial stopping member (118) obstructs the path of lever (68) at the cutout (120) when the lever (68) is displaced in a radially outward direction.

28. The rotary cutting tool (20), according to claim 1, wherein the tool body (22) is disc-shaped.

29. The rotary cutting tool (20), according to claim 1, wherein the rotary cutting tool (20) is a slotting cutter.

30. The rotary cutting tool (20), according to claim 1, wherein the plurality of cutting portions (32) further comprises a non-adjustable cutting portion (32B) that is not adjustable between the non-flexed position and the flexed position.

31. The rotary cutting tool (20), according to claim 30, wherein
the plurality of cutting portions (32) comprises a plurality of adjustable cutting portions (32A) and a plurality of non-adjustable cutting portions (32B);
the tool holder (24) comprises a plurality of adjustment arrangements (60); and
the plurality of adjustable cutting portions (32A) and the plurality of non-adjustable cutting portions (32B) are arranged alternately along the body peripheral surface (30).

32. The rotary cutting tool (20), according to claim 31, wherein the insert pocket (34) of each adjustable cutting portion (32A) open out laterally at the body forward surface (26) and the insert pocket (34) of each non-adjustable cutting portion (32B) open out laterally at the body rearward surface (28).

33. A rotary cutting tool (20) having a tool longitudinal axis (A), defining a forward to rearward direction ($D_F$, $D_R$) and about which the rotary cutting tool (20) is rotatable in a rotational direction (R), the rotary cutting tool (20) comprising
a tool holder (24) having a holder longitudinal axis (H);
a tool body (22) having a body central axis (B), the tool body (22) being releasably attached to a forward end of the tool holder (24) with the body central axis (B) and the holder longitudinal axis (H) being coincident with the tool longitudinal axis (A);
at least one cutting insert (36) mounted on the tool body (22); and
a lever (68) pivotally mounted directly on the tool holder (24) and configured to adjust an axial position of the at least one cutting insert (36) mounted on the tool body (22), without directly contacting the at least one cutting insert.

34. The rotary cutting tool (20), according to claim 33, wherein
the lever (68) comprises a biasing portion (64), a lever actuating portion (80) and a lever middle portion (82) located therebetween;
the lever middle portion (82) comprises at least one lever pivot surface (84) that is pivotally mounted at at least one fulcrum surface (86) on the tool holder (24); and
the lever (68) is configured such that the biasing portion (64) comes into biasing engagement with a portion of the tool body (22) when the lever (68) is pivoted about a pivot axis (P) by applying an actuating force (AF) at the lever actuating portion (80).

35. The rotary cutting tool (20), according to claim 34, wherein
the tool holder (24) comprises a holder peripheral surface (46) extending circumferentially along the tool longitudinal axis (A) and forming a boundary of a holder front surface (48) at a holder forward end (50) of the tool holder (24); and
the rotary cutting tool (20) further comprises a lever channel (96) recessed in the tool holder (24) at the holder front surface (48), the lever channel (96) comprising two opposing lever channel side surfaces (98) and a lever channel central surface (100) extending therebetween; and
the at least one fulcrum surface (86) is located in the lever channel (96).

36. The rotary cutting tool (20), according to claim 33, wherein the rotary cutting tool (20) further comprises an actuating member (106) that is configured to pivot the lever (68) when actuated.

37. The rotary cutting tool (20), according to claim 36, wherein the actuating member (106) is an actuating screw (108).

38. A rotary cutting tool (20), having a tool longitudinal axis (A), defining a forward to rearward direction ($D_F$, $D_R$) and about which the rotary cutting tool (20) is rotatable in a rotational direction (R), the rotary cutting tool (20) comprising
a tool holder (24) comprising:
a holder peripheral surface (46) extending circumferentially along the tool longitudinal axis (A) and forming a boundary of a holder front surface (48) at a holder forward end (50) of the tool holder (24); and
an adjustment arrangement (60) comprising a biasing member (62) which is movably attached to the tool holder (24) and comprises a biasing portion (64); and
a tool body (22), releasably attached to the tool holder (24) at the holder forward end (50) thereof, the tool body (22) comprising:
opposing body forward and rearward surfaces (26, 28) and a body peripheral surface (30) extending therebetween; and
a plurality of angularly spaced apart adjustable cutting portions (32, 32A), each comprising an insert pocket (34) disposed at the body peripheral surface (30);
wherein:
each of the adjustable cutting portions (32A) is adjustable between a non-flexed position and a flexed position;
in the flexed position, the adjustable cutting portion (32A) is elastically deformed in the forward direction ($D_F$) due to the biasing portion (64) pushing against the body rearward surface (28) of the tool body (22) without directly contacting a cutting insert seated in the insert pocket (34); and
the tool body (22) is reversible, whereby the rotational direction is also reversed.

* * * * *